(12) United States Patent
Whitsitt et al.

(10) Patent No.: US 6,622,100 B2
(45) Date of Patent: Sep. 16, 2003

(54) HYPERSPECTRAL ANALYSIS TOOL

(75) Inventors: Stephen J. Whitsitt, Manhattan Beach, CA (US); William M. Bruno, Manhattan Beach, CA (US); Mark Slater, Manhattan Beach, CA (US)

(73) Assignee: Northrop Grumman Corporation, Redondo Beach, CA (US)

( * ) Notice: Subject to any disclaimer, the term of this patent is extended or adjusted under 35 U.S.C. 154(b) by 0 days.

(21) Appl. No.: 09/876,525

(22) Filed: Jun. 7, 2001

(65) Prior Publication Data

US 2002/0193971 A1 Dec. 19, 2002

(51) Int. Cl.$^7$ .............................................. G06F 19/00
(52) U.S. Cl. ........................ 702/76; 702/116; 702/181; 702/189
(58) Field of Search ............................ 702/76, 116, 181, 702/189; 382/275; 348/25; 374/43; 250/339.14, 342; 213/166; 101/174

(56) References Cited

U.S. PATENT DOCUMENTS

| | | | |
|---|---|---|---|
| 4,465,940 A | 8/1984 | Graff et al. | 348/25 |
| 5,129,529 A | 7/1992 | Manyek | 213/166 |
| 5,300,780 A | 4/1994 | Denney et al. | 250/342 |
| 5,323,987 A | 6/1994 | Pinson | 244/3.16 |
| 5,333,815 A | 8/1994 | Sardanowsky | 244/3.16 |
| 5,445,453 A | 8/1995 | Prelat | 374/43 |
| 5,479,255 A | 12/1995 | Denny et al. | 101/174 |
| 5,528,037 A | 6/1996 | Whitsitt | 250/339.14 |
| 5,805,742 A | 9/1998 | Whitsitt | 382/275 |

OTHER PUBLICATIONS

Lurie, et al. "A System for the Processing and Analysis of Multi– and Hyperspectral Data" *SIG Technology Reivew*, pp. 43–58, Winter 1994.

*Primary Examiner*—John Barlow
*Assistant Examiner*—Stephen J. Cherry
(74) *Attorney, Agent, or Firm*—Katten Muchin Zavis Rosenman

(57) ABSTRACT

A system and method for assessing the probability of detection of a target of a hyperspectral sensing system. The system is adapted to calculate the probability of detection of targets based on various sensor parameters, atmospheric conditions, and a specified combination of targets and backgrounds for a given false alarm rate. The system may be executed, for example, on an IBM compatible PC to allow the user to optimize the hyperspectral sensor and subsequent signal processing to a particular set of backgrounds and targets. The sensor models, atmospheric models and target and background profiles are initially applied to the system in the form of the databases. As such, the system enables the user to select among the various parameters to optimize a hyperspectral sensor and the subsequent signal processing for a particular set of parameters.

30 Claims, 3 Drawing Sheets

HYPERSPECTRAL ANALYSIS TOOL

BACKGROUND OF THE INVENTION

1. Field of the Invention

The present invention relates to a hyperspectral analysis tool and more particularly to a method for assessing the performance (i.e. the probability of detecting a target) of a hyperspectral sensing system.

2. Description of the Prior Art

Various tracking systems are known in the art which detect and track objects or targets of interest. Examples of such tracking systems are disclosed in U.S. Pat. Nos. 4,465,940; 5,129,525; 5,323,987; 5,333,815; and 5,445,453 as well as "A System for the Processing and Analysis of Multi- and Hyperspectral Data" by Lurie et al, *SIG Technology Review*, Winter 1994, pages 43–58, hereby incorporated by reference. In particular, infrared, multispectral and hyperspectral systems are known. These sensors detect the spectral radiance of an object, and in particular, the reflected light intensity and wavelength reflected from an object of interest. Infrared systems are known to detect infrared radiation in a single band. However, there are problems with such infrared detection systems. For example, the infrared band may contain a relatively strong background signal which approximates or even exceeds the expected intensity level of the target of interest. Even though such systems utilize threshold detectors, the detection threshold must be set relatively close to the background clutter signal which can result in relatively low detection rates. Accordingly, multispectral and hyperspectral detection systems have been developed to overcome this problem. Such multispectral and hyperspectral detection systems operate on a plurality of spectral bands and are thus able to provide relatively higher detection rates. For example, a multispectral detector may operate at about 10 or more frequency bands while a hyperspectral sensor may operate at a 100 or more frequency bands. Examples of multispectral sensing systems are disclosed in commonly-owned U.S. Pat. Nos. 5,300,780; 5,479,255; and 5,528,037. Hyperspectral sensors are discussed in "A System for the Processing and Analysis of Multi- and Hyperspectral Data" supra.

Unfortunately, relatively simple countermeasures, such as camouflage, flares, or in-band sources, are known to reduce the effectiveness of multispectral sensors. As such, systems have been developed for optimizing the performance of multispectral sensors. For example, as set forth in commonly-owned U.S. Pat. No. 5,528,037, the integration time as well as the bands are selected to optimize the signal-to-noise ratio of a multispectral sensor. The system disclosed in the '037 patent is adapted to be utilized with a relatively small number of bands (i.e. 10 or less) each with large noise where the objective is detection of a single target against all other backgrounds. Even with such optimization, the performance of such multispectral systems still falls below the performance by hyperspectral sensing systems. This higher performance can be attributed to higher spectral resolution and ability to discriminate among subtle spectral differences. Thus, hyperspectral sensors are becoming in more demand. Unfortunately, there are no known systems suitable for assessing the performance of hyperspectral sensors. As such, hyperspectral sensing system performance has heretofore not been able to be assessed. Thus, there is need for providing a method for assessing the performance of a hyperspectral sensing system.

SUMMARY OF THE INVENTION

Briefly, the present invention relates to a system and method for assessing the probability of detection of a target of a hyperspectral sensing system. The system is adapted to calculate the probability of detection of targets based on various sensor parameters, atmospheric conditions, and a specified combination of targets and backgrounds for a given false alarm rate. The system may be executed, for example, on an IBM compatible PC to allow the user to optimize the hyperspectral sensor and subsequent signal processing to a particular set of backgrounds and targets. The sensor models, atmospheric models and target and background profiles are initially applied to the system in the form of databases. As such, the system enables the user to select among the various parameters to optimize a hyperspectral sensor and the subsequent signal processing for a particular set of parameters.

BRIEF DESCRIPTION OF THE DRAWINGS

These and other advantages of the present invention will be readily understood with reference to the following specification and attached drawings, wherein.

DETAILED DESCRIPTION

The hyperspectral analysis system in accordance with the present invention enables the performance (i.e. probability of detection of a target) of a hyperspectral sensing system to be assessed for different user-selected combinations of target and background combinations as well as different atmospheric conditions. In particular, for various user-selected combinations of hyperspectral signatures for different targets and backgrounds, the system is able to compute a signal-to-noise ratio (SNR) and a probability of detection, $P_d$, to enable the performance of the hyperspectral sensing system to be assessed, which heretofore has been unknown.

Figure 2:
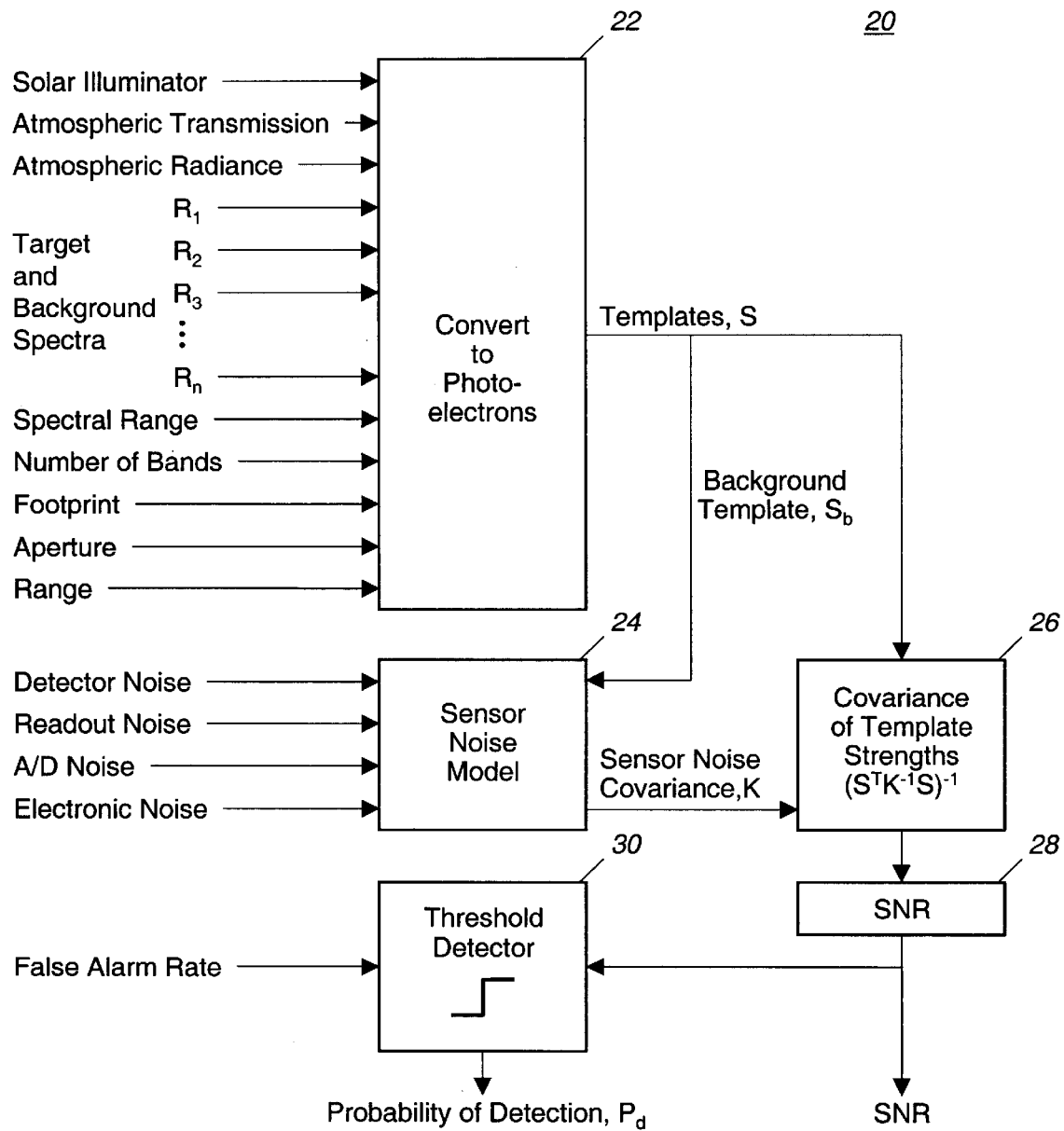
FIG. 2 is a block diagram of the hyperspectral analysis system in accordance with the present invention.

A block diagram of the hyperspectral analysis system is illustrated in FIG. 2 and generally identified with the reference numeral 20. As mentioned above, the inputs to the system 20 are user selectable to enable the system performance to be assessed for different parameters. These inputs may be initially stored in the form of databases, for example, on a diskette. The system may be executed on an IBM compatible PC, for example.

Figure 1:
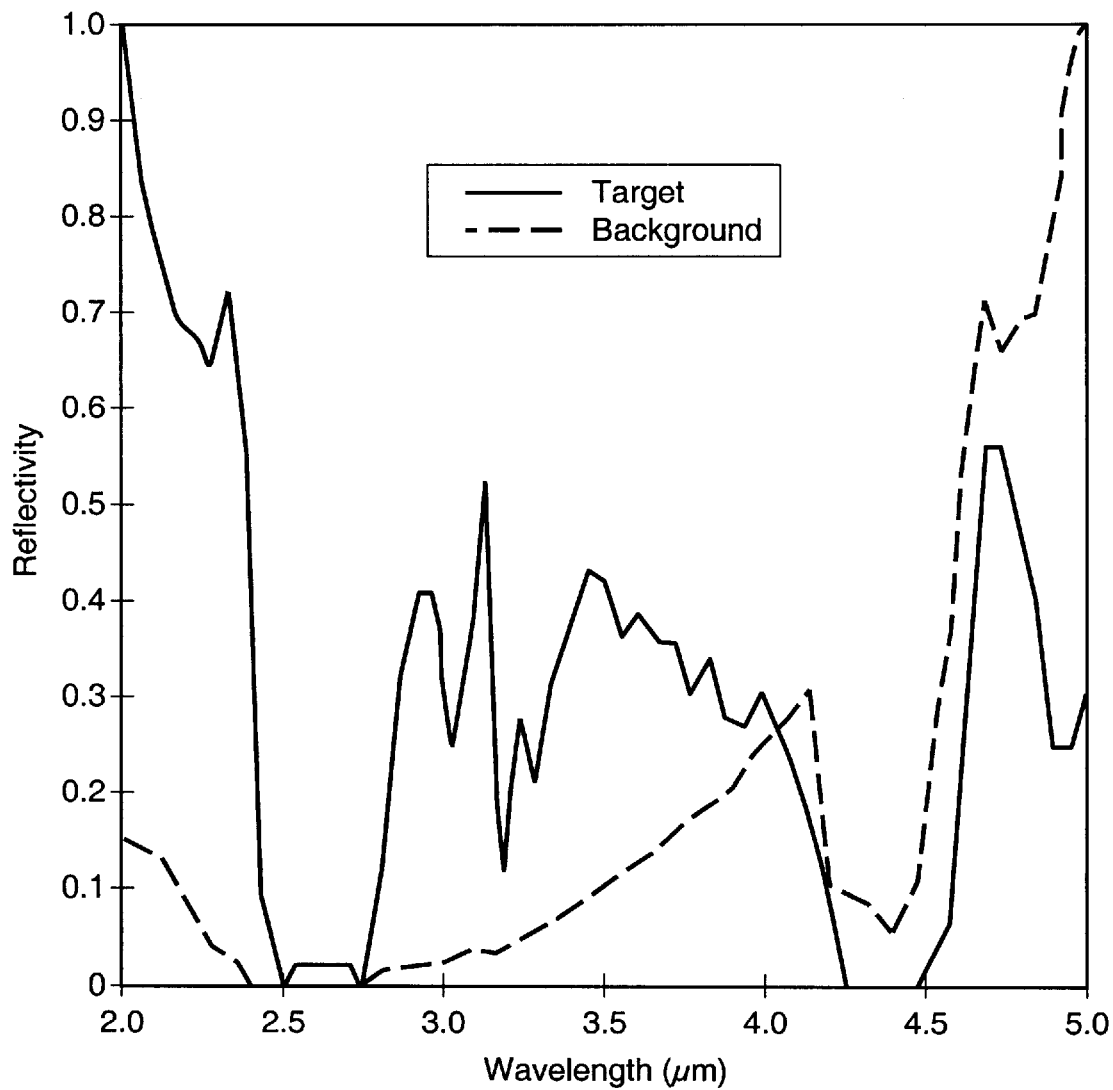
FIG. 1 is a spectral diagram of an exemplary target and background.

Initially, hyperspectral signatures for various targets and background clutter, identified as $R_1, R_2, R_3, \ldots R_n$, are applied to the system. The spectral signature is the reflectivity of an object as a function of wavelength. As is known in the art, hyperspectral signatures for various backgrounds of interest are generated by known hyperspectral sensing systems with no targets present. Similarly, a hyperspectral signature may be generated for each target of interest by itself or against a reference background. As discussed above, such hyperspectral signatures are in the form of reflectivity as a function of wavelength. These hyperspectral signatures are digitized and stored. Exemplary hyperspectral signatures are illustrated in FIG. 1. The solid line represents a target while the dashed line represents a background.

The sensor parameters as well as the atmospheric parameters are also user defined. These sensor parameters include the spectral range or frequency range of each band of the hyperspectral sensor, the range or distance between the sensor and the object to be sensed, the aperture of the sensor as well as the footprint or pattern of the field of view of the hyperspectral sensor. Such sensor parameters are well known in the art and are disclosed in, for example, Volume 4, "Electro-optical Systems Design, Analysis, and Testing", Michael Dudzik, SPIE Optical Engineering Press, 1993, hereby incorporated by reference.

In order to enable the system to assess the performance of a hyperspectral sensor under different atmospheric conditions, various atmospheric parameters may be initially input to the system as discussed above so that they are user selectable. These atmospheric parameters include solar illumination, atmospheric transmission and atmospheric radiance. Determination of the atmospheric parameters is well known in the art, for example, as disclosed in Dudzik, op cit, and Volume 1, "Sources of Radiation", George Zissis, Ed., SPIE Optical Engineering Press, 1993, hereby incorporated by reference. Such atmospheric parameters can be generated by the system by executing public domain software such as MODTRAN, as provided by the United States Government. Also sensor operating conditions, which include the operating altitude of the sensor, and whether the sensor is looking down or to the side are also input into the system 20.

Figure 3:
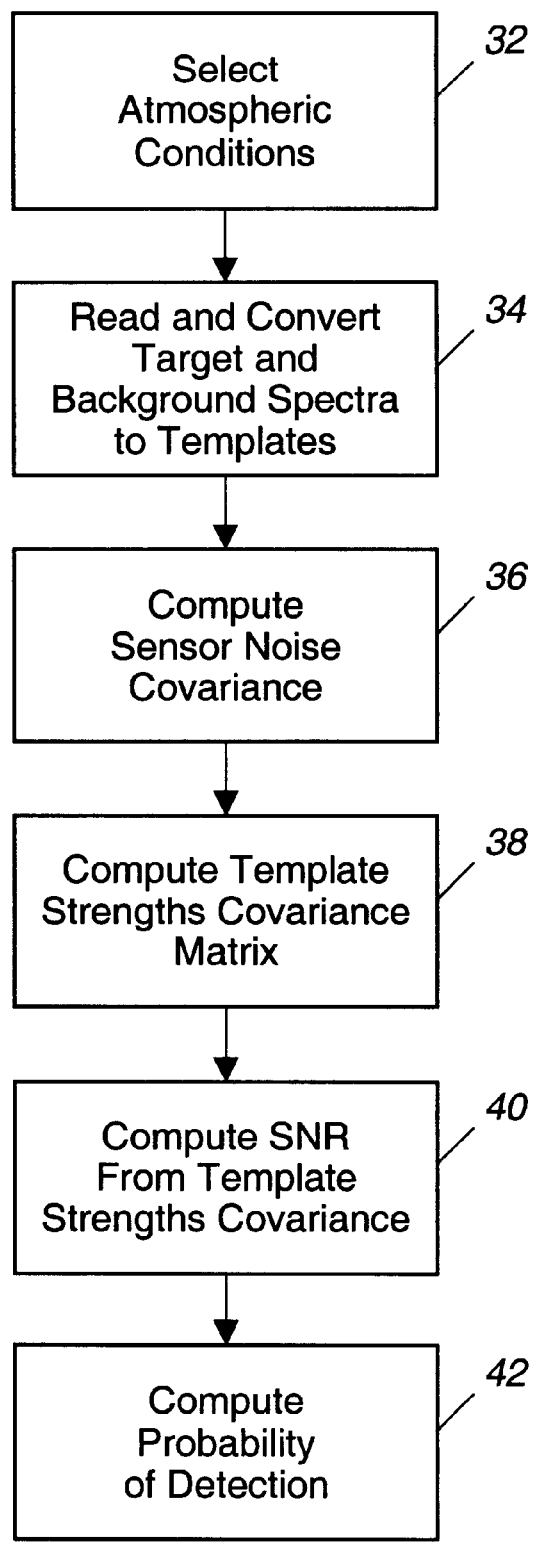
FIG. 3 is a flow chart for the hyperspectral analysis system and process in accordance with the present invention

Referring to FIGS. 2 and 3, after all of the user-defined data, as discussed above, is initially input into the system 20, the system 20 enables a user to select the target and background spectra $R_1, R_2, R_3, \ldots R_n$ from the stored target and background signatures in step 32 (FIG. 3). In addition, the operating altitude and the atmospheric conditions as well as the sensor parameters are either selected from stored data or input by the user. The selected hyperspectral signatures for the target and background spectra are read and interpreted to match the user-selected spectral range and number of bands.

As discussed above, the hyperspectral signatures represent surface reflectivities from the target or background of interest. These surface reflectivities are converted to spectral photo-electrons in the detector array by a function block 22 using (FIG. 2) equation (1) below in step 34 (FIG. 3).

$$S_i=((IR_iT/2\pi)+IB)d^2(A/r^2)(t\lambda\eta\rho)(\Delta\lambda)/(hc) \tag{1}$$

where the individual components of vectors I and T, defined below, are applied to $R_i$ by band (multiply row by row) and where $R_i$ is the surface reflectivity of the target/background i, $S_i$ approximates the photo-electron spectrum of the target/background i; I is the solar irradiance, T is the atmospheric transmission; B is the atmospheric radiance due to haze and scatter, d is the ground sample distance; A is aperture area; t is the integration time; $\eta$ is the detector's quantum efficiency; $\rho$ is the throughput of the optical system; h is Planck's constant; c is the speed of light in vacuum; $\lambda$ is the wavelength; $\Delta\lambda$ is the spectral width of the band; and r is the range to ground. The quantity $S_i$ is a template vector. The terms I, $R_i$, T, B, $\lambda$, $\eta$, and $\rho$ represent column vectors having a size equal to the number of hyperspectral bands.

In order to optimize the performance of the system, the sensor noise covariance K is determined in step 36 by a function block 24. The sensor noise covariance K is based upon a sensor noise model that includes the shot noise combined with other noise sources, such as the analog-to-digital (A/D) quantization noise, dark current noise, read out noise and electronic noise. One of the templates $S_b$ is selected as a background for the determining the shot noise. The determinization of the sensor shot noise as well as the other noise terms is well known in the art, for example, as disclosed in U.S. Pat. No. 5,528,037, Whitsitt.

The sensor noise covariance K and the spectral templates S are applied to a function block 26 which computes a template strength covariance matrix provided by equation (2) below in step 38.

$$K_\alpha=(S^T K^{-1} S)^{-1} \tag{2}$$

where S represents the photo-electron templates, K represents the sensor noise covariances, and $K_\alpha$ represents the covariance of the template strengths. The covariance of measurement template strengths $K_\alpha$ is based on a model as set forth below. In particular, a pixel measurement b may be modeled as set forth in equation (3) below.

$$b=S\alpha+N \tag{3}$$

where S is a matrix of m×1 templates $S_i$ as given in equation (4) below.

$$S=[S_1, S_2, \ldots S_n] \tag{4}$$

and $\alpha$ is a n×1 vector of template strengths as given in equation (5) below.

$$\alpha = \begin{bmatrix} \alpha_1 \\ \alpha_2 \\ \vdots \\ \alpha_n \end{bmatrix} \tag{5}$$

N is sensor noise with covariance K.

Equation (3) may be best understood with reference to an example. In particular, consider two classes of background spectra, such as soil and grass, represented by template vectors $S_1$ and $S_2$ and a target template target vector represented by the spectrum $S_3$. Assume that the template vectors $S_1$, $S_2$ and $S_3$ correspond to template strengths $\alpha_1$, $\alpha_2$ and $\alpha_3$, respectively. As such, when the sensor is over soil, the respective template strengths for $\alpha_1$, $\alpha_2$ and $\alpha_3$ are 1, 0, 0, respectively. Similarly, when the sensor is over grass the respective template strengths for $\alpha_1$, $\alpha_2$ and $\alpha_3$ are 0, 1, 0, respectively. When the sensor is over a target, the respective template strengths $\alpha_1$, $\alpha_2$ and $\alpha_3$ are 0, 0, 1 respectively.

The template strengths for a given spectrum are computed by a weighted least squares method, which is well known in the art. Equation (6) may be used to determine the template strengths.

$$\alpha=(S^T K^{-1} S)^{-1} S^T K^{-1} b. \tag{6}$$

In order to determine the signal-to-noise ratio of the system it is necessary to compute the covariance of the template strengths as indicated by the function block 26. The covariance of the templates strengths is based on the noise from the sensor noise model 24 for a given spectrum. For example, assuming a target template strength of 1, equation (2) is used to determine the template strength covariance. In particular, the diagonal terms in the covariance matrix represented by equation (2) represent the individual $\alpha_i$ covariances in the estimate represented by equation (6). These covariances of the template strengths are then used to determine the signal-to-noise ratio (SNR) as indicated in step 40. It is convenient to define template SNR for each template under the same condition $\alpha_i=1$. The SNR is defined by equation (7) below;

$$SNR_i=1/\sqrt{(K_\alpha)_i} \tag{7}$$

where $(K_\alpha)_i$ is the $i^{th}$ diagonal component of $K\alpha$.

Thus, for a template strength, as an example, for a target as discussed above of 1, and a covariance of a template strength computed to be 0.01, then the SNR is 10. The signal-to-noise ratio may then be applied to a threshold detector 30 (FIG. 2) along with a desired false alarm rate signal to provide a probability of detection $P_d$ as set forth in step 42. As such, for a given SNR and given desired false alarm rate, the system 20 can compute the probability of detection $P_d$ of a target in the presence of numerous simultaneous background spectra, with a simple threshold detector. The probability of the detection of a target $P_d$ for hyperspectral sensor was heretofore unknown.

Off-diagonal terms in the template strength covariance are a measure of similarity between templates. This feature allows further optimization of hyperspectral systems by giving designers a method of choosing the best template sets to enhance detection and discriminate among multiple target and background types. A feature of equation (6) is that template strength α is measured in a dimension orthogonal to all other templates, reducing variability in performance due to uncertainty in template strength.

Obviously, many modifications and variations of the present invention are possible in light of the above teachings. Thus, it is to be understood that, within the scope of the appended claims, the invention may be practiced otherwise than as specifically described above.

What is claimed and desired to be covered by a Letters Patent is as follows:

1. Apparatus for determining the performance of a hyperspectral sensor comprising:
   means for receiving various user-supplied data including target and background spectral data, said data consisting of a plurality of frequency bands;
   means for receiving atmospheric data;
   means for receiving hyperspectral sensor data of an entire spectral signature:
   means for converting target and background spectral data to spectral templates utilizing all of the frequency bands in said entire spectral signature;
   means for computing a sensor noise covariance for a predetermined sensor;
   means for computing a template strength covariance for said sensor noise covariance and said spectral templates; and
   means for computing a signal-to-noise ratio (SNR) from said template strength covariance.

2. Apparatus as recited in claim 1, further including means for computing the probability of detection $P_d$ of said hyperspectral sensor from said SNR.

3. Apparatus as recited in claim 2, wherein said probability of detection computing means includes a threshold detector having multiple inputs.

4. Apparatus as recited in claim 3, wherein the signal-to-noise ratio is applied to one of said plurality of said inputs of said threshold detector.

5. Apparatus as recited in claim 4, further including means for receiving user-selected data regarding a false alarm rate and wherein said false alarm rate is applied to another of said plurality of inputs of said threshold detector.

6. Apparatus as recited in claim 1, wherein said atmospheric data includes solar illumination.

7. Apparatus as recited in claim 1, wherein said atmospheric data includes atmospheric transmission.

8. Apparatus as recited in claim 1, wherein said atmospheric data includes atmospheric radiance.

9. Apparatus as recited in claim 1, wherein said user-supplied data includes a spectral range of a hyperspectral sensor of interest.

10. Apparatus as recited in claim 1, wherein said user-supplied data includes data for the number of bands of interest.

11. Apparatus as recited in claim 1, wherein said user-supplied data includes data for a footprint of interest.

12. Apparatus as recited in claim 1, wherein said user-supplied data includes data for a sensor aperture of interest.

13. Apparatus as recited in claim 1, wherein said user-supplied data includes data for a sensor range of interest.

14. Apparatus as recited in claim 1, wherein said sensor noise covariance computing means includes a sensor noise model.

15. Apparatus as recited in claim 14, wherein said sensor noise model includes detector noise.

16. Apparatus as recited in claim 14, wherein said sensor noise model includes readout noise.

17. Apparatus as recited in claim 14, wherein said sensor noise model includes A/D noise.

18. Apparatus as recited in claim 14, wherein said sensor noise model includes electronic noise.

19. Appartus as recited in claim 14, where said sensor noise model includes photon noise.

20. A method for determining the performance of a hyperspectral sensing system comprising the steps of:
   (a) receiving various user-supplied spectral data including target and background spectral data, said data including multiple frequency bands;
   (b) receiving atmospheric data;
   (c) receiving hyperspectral sensor data of an entire spectral signature;
   (d) converting selected target and background data to spectral templates utilizing all of the frequency bands in said entire spectral signature;
   (e) computing a sensor noise covariance for a predetermined sensor;
   (f) computing a template strength covariance for said sensor noise covariance and said spectral templates; and
   (g) computing a signal-to-noise ratio (SNR) from said template strength covariance.

21. The method as recited in claim 20 further including a step of computing the probability of detection $P_d$ from said SNR and a user specified false alarm rate.

22. The method as recited in claim 20, wherein said atmospheric data includes solar illumination.

23. The method as recited in claim 20 wherein said atmospheric data includes atmospheric transmission.

24. The method as recited in claim 20, wherein said atmospheric data includes atmospheric radiance.

25. The method as recited in claim 20, wherein said sensor noise covariance computing step includes a sensor noise model.

26. The method as recited in claim 25, wherein said sensor noise model includes detector noise.

27. The method as recited in claim 25, wherein said sensor noise model includes readout noise.

28. The method as recited in claim 25, wherein said sensor noise model includes A/D noise.

29. The system as recited in claim 25, wherein said sensor noise model includes electronic noise.

30. The system as recited in claim 25, wherein said sensor noise model includes photon noise.

* * * * *